Jan. 5, 1926.

W. E. WEBSTER

FREIGHT SKID

Filed Feb. 16, 1925

1,568,303

Inventor
W. E. WEBSTER.

Attorney

Patented Jan. 5, 1926.

1,568,303

UNITED STATES PATENT OFFICE.

WILLIAM E. WEBSTER, OF BIRMINGHAM, ALABAMA.

FREIGHT SKID.

Application filed February 16, 1925. Serial No. 9,368.

*To all whom it may concern:*

Be it known that I, WILLIAM E. WEBSTER, a citizen of the United States of America, residing at Birmingham, in the county of Jefferson and State of Alabama, have invented certain new and useful Improvements in Freight Skids, of which the following is a specification.

My invention relates to freight skids which are used in loading and unloading railroad cars and trucking freight to and from floors or platforms at different elevations.

More particularly, my invention relates to the designing of a light skid which is formed in longitudinal sections, each light enough to be readily handled by a man so as to facilitate the placing and removal of the skids and which are adapted to be readily interlocked when in use so as to provide a skid of requisite width for the trucks.

My invention has for its further object the designing of hinged aprons at the ends of the skid sections, which aprons are of such character and are so hinged that they will permit the truck wheels to ride easily onto and off from the skid without tending to displace the latter or to damage the freight on the truck. One of the most serious objections to the present rigid type of skid is the frequent overturning of the truck or the dropping of its contents due to the skid being displaced by the truck wheels striking its ends with great force and permitting the loaded truck to fall to the ground or lower level.

My invention further comprises the novel details of construction and arrangements of parts, which in their preferred embodiment only are illustrated in the accompanying drawings which form a part of this specification, and in which:—

Similar reference numerals refer to similar parts throughout the drawings.

Figure 3:
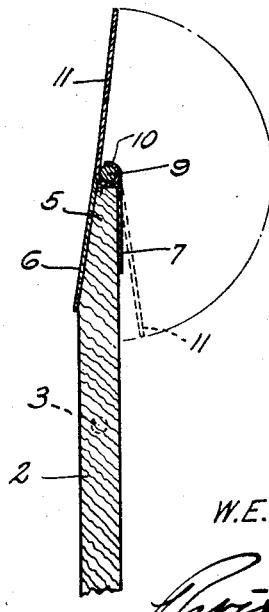
Fig. 3 is a longitudinal section of Fig. 2 on the line 3—3, showing the manner of mounting and folding the apron on the skid ends.

In the preferred embodiment of my invention, which is illustrated, the skid is made up in two longitudinal half sections 1 and 2, which are duplicates except that one of these sections along a side edge is provided with dowel pins 3, while the edge of the other section is provided with corresponding dowel pin holes 4. These skid sections as used in railroad freight service are about 16″ wide and vary in length according to the duty contemplated. They are usually made up of body portions each formed by a plank having the upper face of its ends bevelled at 5 and adapted to receive a plate 6, preferably having the full width of the skid section and covering all of its bevelled portion 5 and extending slightly beyond the end thereof where the plate is bent back upon itself to provide a bottom plate 7 which is attached to the underside of the skid section. The overhung bend or bight in the plate is cut away to form hinge elements 8 adapted to receive a hinge pin 9 and to co-ordinate with hinge elements 10 formed on each apron 11 by bending tongues on one hinged end of the latter back under it. By this arrangement it will be observed that the hinge pin will hold the top surface of the apron 11 in position to form a continuation of the top reinforcing plate 6 but leaves it free to swing about the hinge as a center so that it will rest upon the platform or car as the case may be and afford an incline up or down which the truck wheels will ride from the car onto the skid and thence to the platform, and vice versa without giving any obstruction or presenting any element against which the truck wheels would strike and tend to dislodge the skid or overturn the truck. The aprons 11 are free to fold entirely under the skid, see dotted lines Fig. 3, thus shortening it for storage or transportation and enabling the aprons to be effectively protected when not in use.

Figure 1:
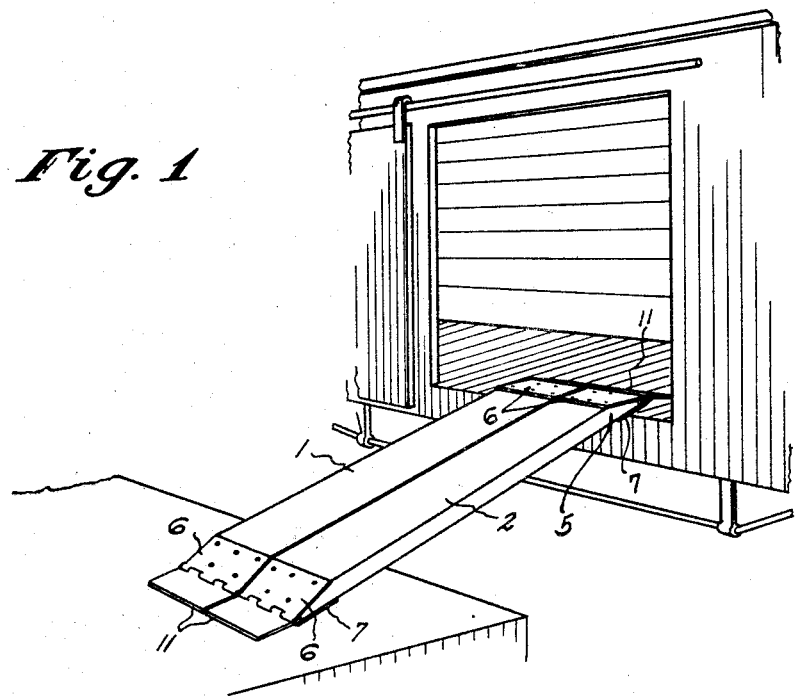
Fig. 1 illustrates in a perspective view my sectional freight skid assembled for service to load or unload a freight car.
Figure 2:
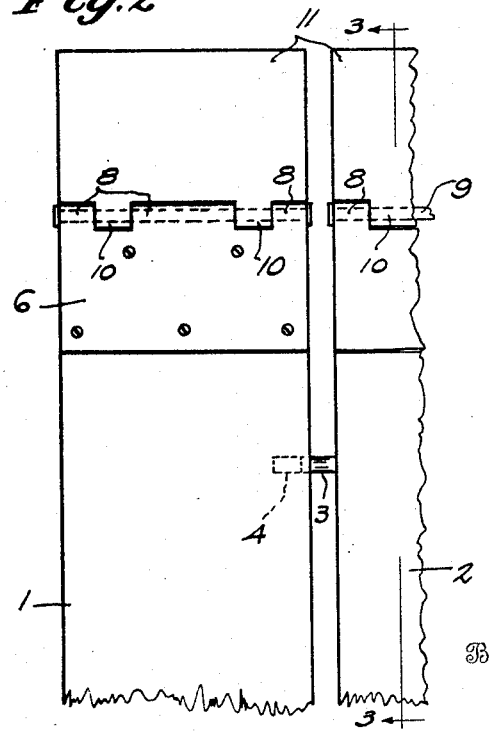
Fig. 2 is a plan view of one end of the skid sections separated, one skid section being broken away.

In use the skids are carried in sections to the loading point, the sections are connected by dowels and the aprons 11 are set so as to project beyond the skid and rest upon the car or platform, as shown more clearly in Fig. 1, thereby presenting a skid free of obstruction to the movement of the truck wheels.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A freight skid formed in longitudinal half sections having interconnecting dowels and dowel holes on their abutting side edges, each section having hinges at each end to connect thereto a flat metallic apron adapted to provide inclined approaches to both ends of the skid, and to swing freely above and below the plane of the skid.

2. A freight skid having a wooden body with both ends tapered towards its bottom plane and having metal reinforcements about and overhanging beyond the tapered wooden ends, metal aprons and means to hingedly connect them to the overhung ends of said reinforcements to be free to swing above and below the plane of the skid.

3. A freight skid having a wooden body with tapered ends having metal reinforcements fastened to and slightly overhung from said ends, metal aprons, and hinge pins connecting said aprons to the overhung ends of said reinforcements free to fold under the skid.

4. A freight skid having a wooden body with tapered ends, a folded metal plate bent to form a bight and attached to the top and bottom sides of each tapered end of the skid, and a metal apron having downturned hinge eyes and means to hinge said eyes to the bight of said plate leaving the apron free to swing above or below the skid.

5. A freight skid having a wooden body with tapered ends, a folded metal plate of equal width with the skid which is attached to the top and bottom sides at each tapered end of the skid with its bight projecting beyond same and cut away to form hinge elements, and a metal apron having downturned hinge eyes adapted to interleaf with the bight of said plate and hinge pins which connect the aprons to the bight of said plates free to swing above and below the skid and to fold in under same.

6. A freight skid formed of two readily separable longitudinal half sections, dowels to hold said sections, when assembled, against longitudinal displacement, each section being formed by a board having the upper surface of its ends tapered, a reinforcing metal hinge plate for each section end, which plate is of substantially the width of the section and is bent to receive in its bight a tapered end of the skid section, means to fasten a plate to each section end with its bight overhung and cut away to provide hinge elements, a hinge pin received in the bight of each plate, and an apron for each end formed by a metal plate having a tongue bent under to form a hinge element adapted to co-act with the hinge pin and hinge element of its respective plate.

In testimony whereof I affix my signature.

WILLIAM E. WEBSTER.